United States Patent
Breuning et al.

(10) Patent No.: US 6,250,333 B1
(45) Date of Patent: Jun. 26, 2001

(54) SERVOVALVE

(75) Inventors: Edwin Breuning, Denkendorf; Bernd Schiek; Gerd Speidel, both of Winterbach, all of (DE)

(73) Assignee: Mercedes-Benz Lenkungen GmbH, Düsseldorf (DE)

( * ) Notice: Subject to any disclaimer, the term of this patent is extended or adjusted under 35 U.S.C. 154(b) by 0 days.

(21) Appl. No.: 09/463,658

(22) PCT Filed: Jul. 22, 1998

(86) PCT No.: PCT/EP98/04599

§ 371 Date: May 2, 2000

§ 102(e) Date: May 2, 2000

(87) PCT Pub. No.: WO99/06263

PCT Pub. Date: Feb. 11, 1999

(30) Foreign Application Priority Data

Jul. 31, 1997 (DE) .............................. 197 33 031

(51) Int. Cl.⁷ .................................. B62D 5/083
(52) U.S. Cl. ................. 137/625.23; 137/625.21; 91/375 R
(58) Field of Search ............... 91/375 A, 375 R; 137/625.23, 625.21, 625.22

(56) References Cited

U.S. PATENT DOCUMENTS

| 4,488,475 | * | 12/1984 | Masuda et al. ............... 91/375 R X |
| 4,799,514 | * | 1/1989 | Tanaka et al. ................ 137/625.23 |
| 4,905,572 | * | 3/1990 | Devaud et al. ................... 91/375 R |
| 5,058,696 | * | 10/1991 | Prebay et al. ............... 91/375 R X |
| 5,797,309 | * | 8/1998 | Eberhart ....................... 91/375 A |
| 5,845,557 | * | 12/1998 | Speidel et al. ................ 91/375 A |

FOREIGN PATENT DOCUMENTS

| 42 34 571 | 4/1994 | (DE) . |
| 196 15 543 | 10/1997 | (DE) . |
| 0 072 712 | 2/1983 | (EP) . |
| 2496583 | * | 6/1982 | (FR) ............... 91/375 R |

* cited by examiner

*Primary Examiner*—John Rivell
*Assistant Examiner*—Meredith H. Schoenfeld
(74) *Attorney, Agent, or Firm*—Evenson, McKeown, Edwards & Lenahan, P.L.L.C.

(57) ABSTRACT

A servovalve, in particular for hydraulic power-assisted steering systems of motor vehicles, is in the form of a rotary spool valve with a rotary spool and a control bush, which coaxially surrounds the rotary spool and can be rotated against spring force relative to the rotary spool. A bearing, by which the control bush and the rotary spool are secured axially relative to one another, is integrated into the rotary spool valve.

17 Claims, 3 Drawing Sheets

SERVOVALVE

BACKGROUND OF THE INVENTION

This invention relates to a servovalve, in particular for hydraulic power-assisted steering systems of motor vehicles, in the form of a rotary spool valve with a rotary spool and a control bush, which coaxially surrounds the rotary spool and can be rotated against spring force relative to the rotary spool.

Such servovalves are, for example, known from DE 42 34 571 A1 and U.S. Pat. No. 4,966,192. In the case of a power-assisted steering system, the rotary spool and the control bush form parts of a train of shafts which mechanically connects a manual steering wheel to the steered vehicle wheels. In this arrangement, a shaft part, which is torsionally connected to the control bush, and a shaft part, which supports or includes the rotary spool, are connected together by a torsion bar so that they are axially secured but torsionally flexible. The rotary spool and the control bush are deflected relative to one another from a relative central position to a greater or lesser extent corresponding to the forces and torques effective between the manual steering wheel and the vehicle steering wheels. This rotary travel between the control bush and the rotary spool has the effect that a hydraulic servomotor controlled by the servovalve is acted upon in a controllable manner by hydraulic pressure or by a hydraulic pressure difference in one or the other direction, depending on the direction of the relative twist between the control bush and the rotary spool supports the respective steering manoeuvre, i.e. the manual force to be applied to the manual steering wheel is correspondingly reduced.

The spring force is typically generated by a torsion bar which mechanically connects the rotary spool to the control bush. In order to accommodate the torsion bar, the rotary spool and the parts of the control bush axially abutting it or the elements torsionally connected to the control bush have a tubular configuration.

In DE 196 15 543 A, published after the claimed priority date, a servovalve, of the type mentioned at the beginning, is described in which a first axial extension is arranged eccentrically to the axis of the rotary spool valve at one end face of the control bush.

An end surface, which faces towards the aforesaid end face, has a further extension of the same type as the first extension and has the same radial distance from the axis of the rotary spool valve as the first extension. The end face is arranged at an axial distance from the free end of this extension on a part which is torsionally connected to the rotary spool, and the total axial length of the extensions is somewhat shorter than the axial distance between the end face of the control bush and the end surface.

A C-spring, which surrounds the rotary spool and whose free ends are clamped against the extensions and try to force the latter into a mutually aligned position, is arranged between the said end face of the control bush and the said end surface.

This realizes the general idea of arranging, axially between an end face of the control bush and a part at the rotary spool end, a ring-type spring, which surrounds a section of the rotary spool and which is bent open to a greater or lesser extent during relative rotations between the control bush and the rotary spool because the extensions then move away from one another in the peripheral direction of the rotary spool section.

A particular advantage of this design is the ease of assembly of the C-spring. In addition, the C-spring can also be configured with preload in such a way that a specified spring loading is still present when the pins are mutually aligned.

In accordance with this older patent application, provision is usually made for the rotary spool and the control bush to be additionally connected by way of a torsion bar, which is accommodated within a tubular inner space of the rotary spool and is firmly connected at one end to the rotary spool, for example by pinning, and is firmly connected at its other end to the control bush or parts connected to the latter. This torsion bar, as well as the aforesaid C-spring, effects an increasing restoring force in the case of relative rotations between the control bush and the rotary spool.

In addition, the torsion bar is used to secure the control bush and the rotary spool axially relative to one another.

SUMMARY OF THE INVENTION

The object of the invention is to ensure a fixed axial position of the rotary spool and the control bush relative to one another in a simple design manner, in a servovalve of the type mentioned at the beginning, even when no torsion bar is provided.

This object is achieved, in accordance with the invention, by firmly connecting the control bush to a sleeve on the same axis and arranging or configuring a bearing axially between the control bush and the sleeve, which bearing secures the control bush and the rotary spool axially relative to one another.

The invention is based on the general idea of integrating a bearing into the rotary spool valve and, to achieve a simple arrangement or configuration, of combining the control bush with a sleeve axially abutting it in order to form a tubular part which surrounds the bearing and which can be dismantled.

As a result, it is then possible to achieve an arrangement which can be assembled by pushing parts axially onto one another or by placing them axially on one another.

Provision is preferably made to force the spool bush and the rotary spool into a central rotational position relative to one another by means of a preloaded C-spring. In this connection, it is expedient for a first axial extension to be arranged eccentrically to the axis of the rotary spool valve at the end face of the sleeve facing away from the control bush. An end surface, which faces towards the end face, has a further extension of the same type as the first extension, and has the same radial distance from the axis of the rotary spool valve as the first extension, is arranged at an axial distance from the free end of this extension on a part which is torsionally connected to the rotary spool. The total axial length of the extensions are somewhat shorter than the axial distance between the end face of the sleeve and the end surface of the part which is torsionally connected to the rotary spool, and the C-spring is arranged between the end face of the sleeve and the end surface of the part torsionally connected to the rotary spool in such a way that this C-spring surrounds a section of the rotary spool and its free ends are clamped against the extensions.

In addition to easier assembly, this construction offers the advantage that it permits a rotational adjustment of the control bush relative to the sleeve and therefore to the sleeve-end extension when the control bush and the sleeve are connected, which extension, together with the other extension in interaction with the C-spring, in turn specifies the central rotational position or initial position of the rotary spool valve.

With respect to preferred features of the invention, reference is otherwise made to the claims and the following explanation of the drawings, by which particularly preferred embodiments of the invention are described.

DESCRIPTION OF THE PREFERRED EMBODIMENTS

Figure 1:
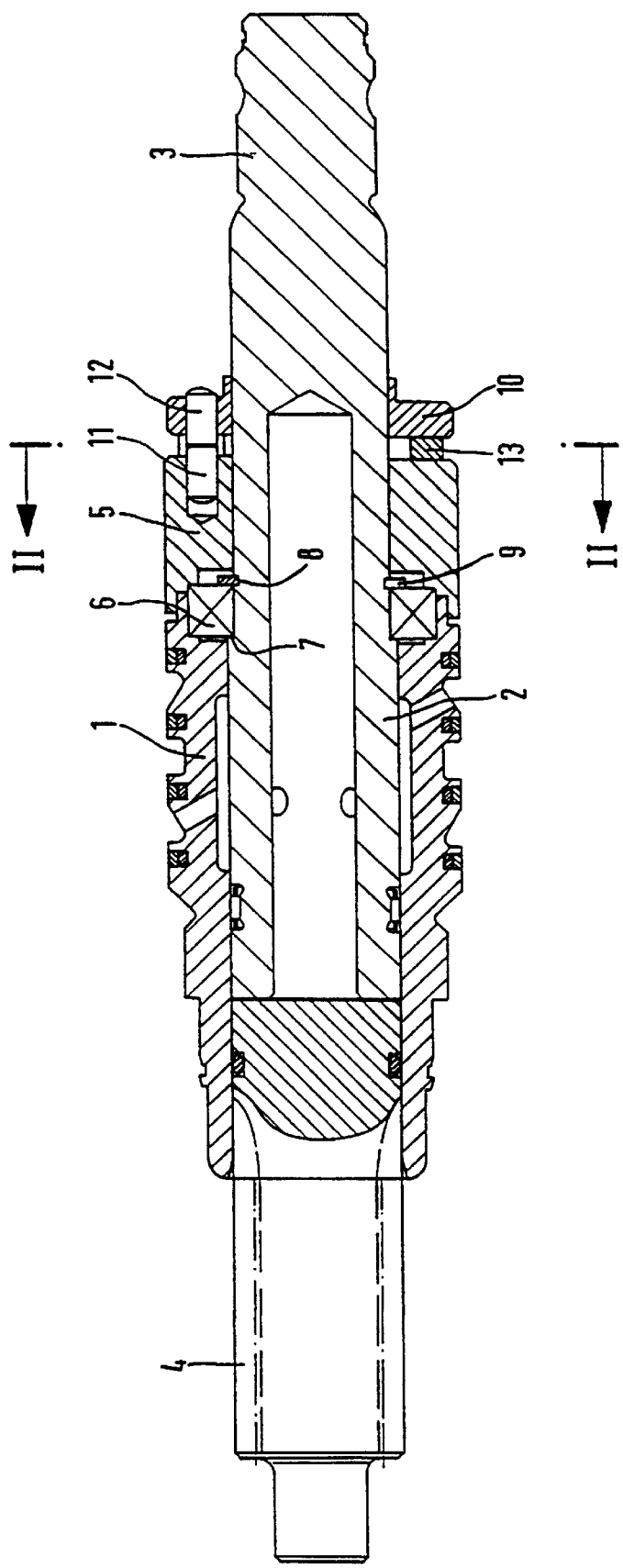
FIG. 1 shows an axial section through the servovalve, which is configured as a rotary spool valve, in accordance with the invention.

The servovalve according to the invention, as shown in FIG. 1, has a control bush 1 which coaxially surrounds a rotary spool 2, with the control bush 1 and the rotary spool 2 being able to rotate relative to one another. The rotary spool 2 is provided with an axial hole and is continued to the right, in FIG. 1, in a shaft part 3. The control bush 1 is torsionally coupled to a shaft part 4. The latter has axial splines, which are open at the left-hand end face of the shaft part 4, which extend into the region of the shaft part 4 overlapped by the control bush 1 and which run out in the vicinity of the unsplined right-hand end face of the shaft part 4. At its left-hand end region, the control bush 1 has internal splines which match the aforesaid axial splines of the shaft part 4. In the assembled condition of the servovalve shown, the shaft part 4 is axially secured by its right-hand end face abutting the end face, facing towards it, of the rotary spool 2 and by the end region, facing away from this end face, of the unsplined section of the shaft part 4 interacting in the manner of a stop with the internal splines of the control bush 1.

A sleeve 5, which is on the same axis as the control bush 1 and is firmly connected to it, abuts the control bush 1 on the right. The connection is configured in such a way that, within the connection region, a bearing 6, which can be loaded axially and preferably also radially, is securely surrounded axially on its outer surface or on its outer bearing shell by the control bush 1 and the sleeve 5. The inside or the inner bearing shell of the bearing 6 is firmly secured axially on the rotary spool 2 or on the shaft part 3. For this purpose, an annular step 7 with a front surface facing towards the right is configured on the rotary spool 2 or on the shaft part 3. In the vicinity of the annular step 7, an annular groove 8 for a spring ring 9 is arranged on the outer surface of the rotary spool 2 or the shaft part 3, so that the bearing 6 is firmly secured axially between the control bush 1 and the sleeve 5, on the one hand, and between the annular step 7 and the spring ring 9, on the other; the control bush 1 and the rotary spool 2 are correspondingly secured axially relative to one another.

A flange 10 is securely arranged on the rotary spool 2 or on the shaft part 3 at an axial distance from the right-hand end face of the sleeve 5. Pins 11 and 12, which are of the same type and are parallel to and at the same distance from the common axis of the control bush 1 and the rotary spool 2, are secured on the mutually facing end faces of the sleeve 5 and the flange 10. The total length of the free ends of the pins 11 and 12 s slightly less than the axial distance between the mutually facing end surfaces of the sleeve 5 and the flange 10 so that the pins 11 and 12 cannot prevent a relative rotation between the sleeve 5 and the flange 10 (or the rotary spool 2 or shaft part 3 torsionally connected to it).

A C-spring 13, which surrounds the rotary spool 2 or the shaft part 3, is arranged in the axial distance space between the sleeve 5 and the flange 10. The axial width of this C-spring 13 in the direction of the axis of the control bush 1 and the rotary spool 2 corresponds approximately to the axial distance between the mutually facing end surfaces of the sleeve 5 and the flange 10.

Figure 2:
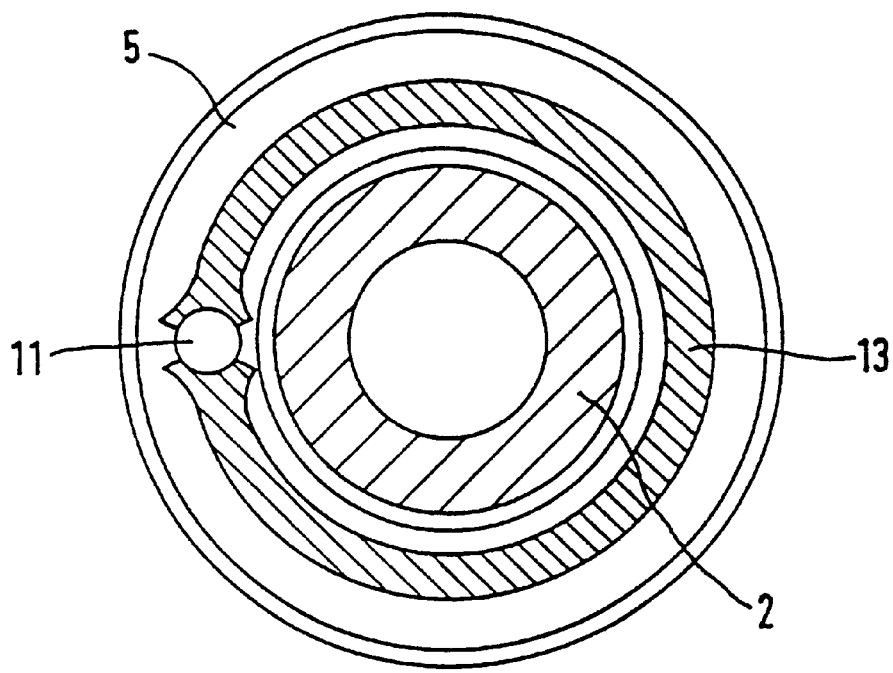
FIG. 2 shows a sectional view corresponding to the section line II—II in FIG. 1.

The free ends of the C-spring 10 are clamped against the pins 11 and 12, which are accommodated as a form-fit by semi-tubular end surfaces of the C-spring 13, i.e. end surfaces having a semi-circular profile as shown in FIG. 2.

During relative rotations between the sleeve 5 and the flange 10, or between the control bush 1 and the rotary spool 2, the pins 11 and 12 move apart in the peripheral direction of the rotary spool 2, whereupon the C-spring 13 is opened up to a greater or lesser extent because one of its ends is respectively taken along by the pin 11 and its other end is respectively taken along by the other pin 12. In consequence, the C-spring 13 generates an increasing restoring force, which tries to bring the pins 11 and 12 into a mutually aligned position in which the control bush 1 and the rotary spool 2 take up their relative central position.

The C-spring 13 preferably has a preload, which is also effective when the pins 11 and 12 are mutually aligned. In consequence, a relative rotation between the control bush 1 and the rotary spool 2 can then only occur when a torque, which is larger than the preload, acts between these two parts.

Figure 3:
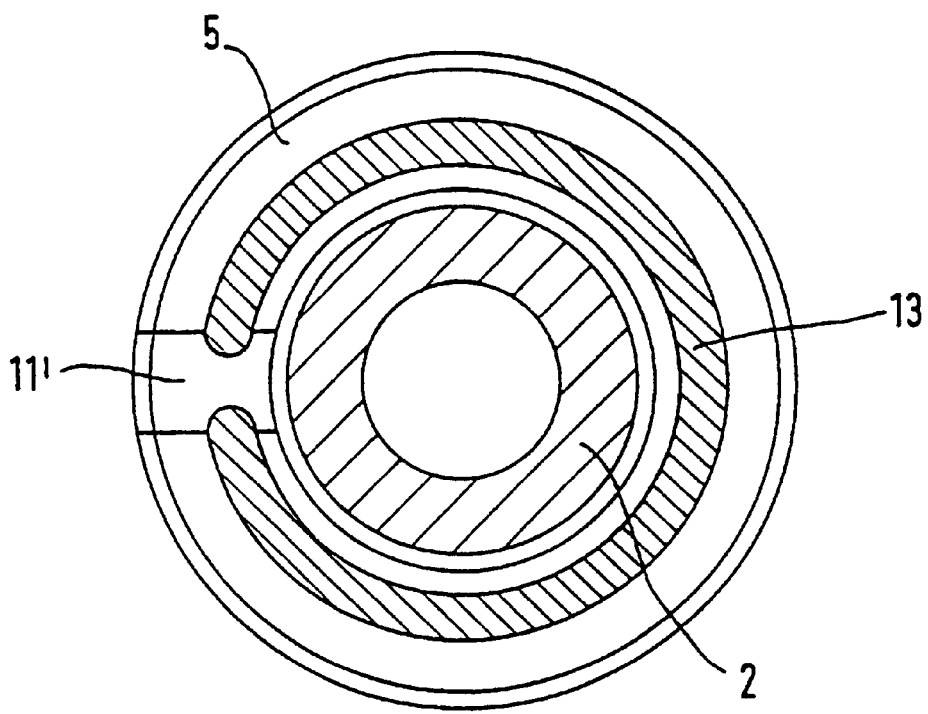
FIG. 3 shows a section view, corresponding to FIG. 2, of a modified embodiment

The embodiment shown in FIG. 3 differs essentially from the design described by way of FIGS. 1 and 2 in that, instead of the pins 11 and 12, axial extensions 11' and 12' are respectively provided which have, on their essentially radial flanks relative to the axis of the control bush 1, groove-shaped recesses on both sides, which have semi-circular profiles and the same radial distances from the axis of the control bush 1. The C-spring 13 engages in these recesses with ends profiled in complementary manner so that, as a result, the same function is provided as in the case of the embodiment of FIGS. 1 and 2.

Figure 4:
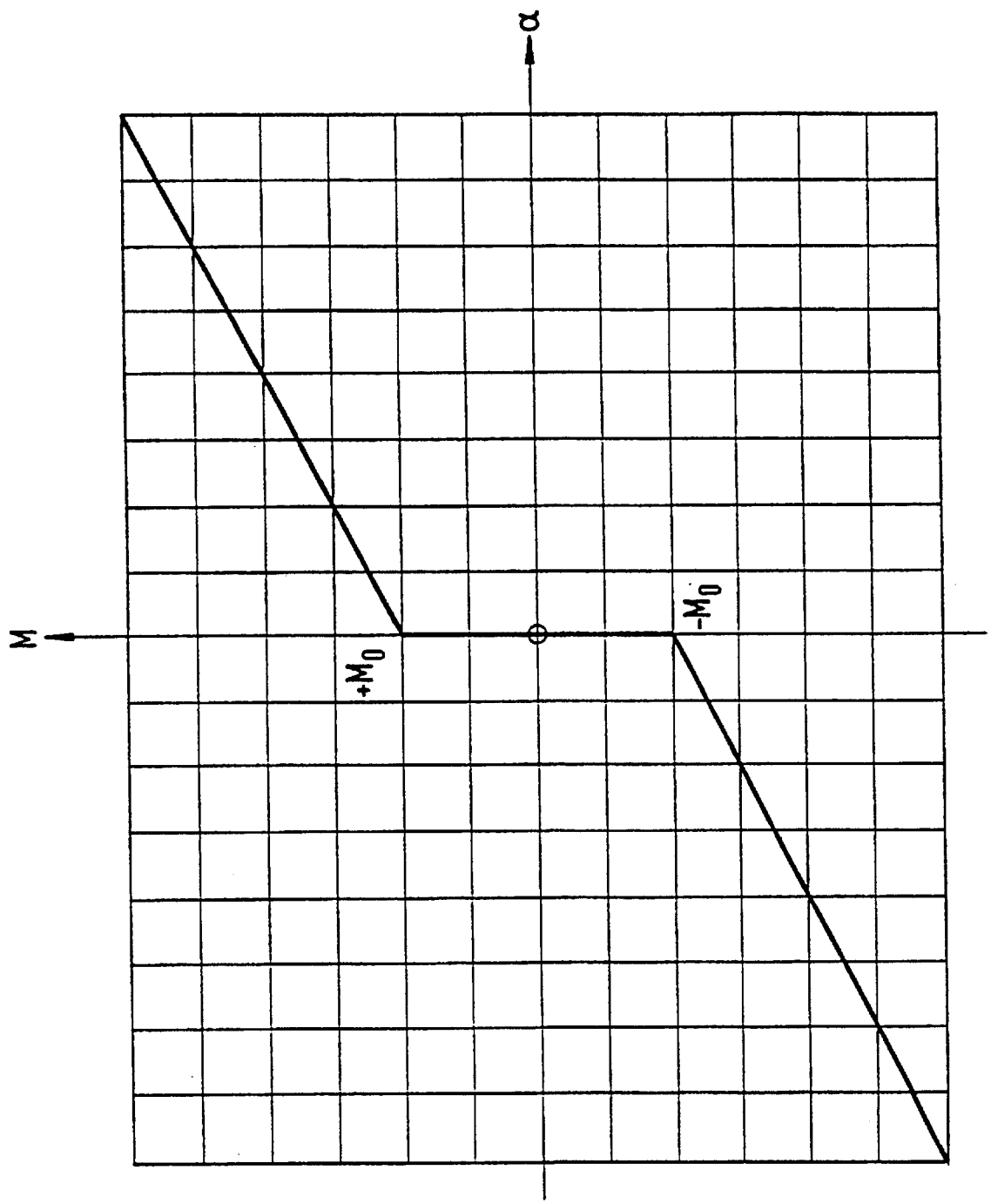
FIG. 4 shows a diagram which reproduces the spring characteristic of the C-spring.

The diagram of FIG. 4 shows the characteristic of the C-spring 13, i.e. the restoring torque M effected by the spring 13 is shown as a function of the angle of twist $\alpha$ between the control bush 1 and the control spool 2. Because of the preload on the C-spring 13, an initial torque $+M_0$ or $-M_0$ must be overcome in each case when the control bush 1 and the rotary spool 2 depart from their central position, the sign indicating the relative direction of rotation. A continuously increasing restoring torque then appears as the angles of twist become larger.

If the shaft parts 3 and 4 are part of a mechanical drive between steered vehicle wheels and a manual steering wheel or some other manual steering control of a vehicle, no rotational adjustment between the control bush 1 and the rotary spool 2 relative to the central position will occur while only small steering torques are transmitted between manual steering wheel or manual steering control and steered vehicle wheels. It is only when the magnitude of the steering torque exceeds the magnitude of $M_0$ that the control bush 1 and the rotary spool 2 are rotated relative to one another to a greater or lesser extent with the result that the servovalve formed by the control bush 1 and the rotary spool 2 activates a servomotor of the vehicle steering gear in order to generate a larger or smaller servoforce which supports the respective steering manoeuvre. In the case of steering torques which remain less than the magnitude of $M_0$, the servovalve does not generate any servoforce. This ensures that the driver obtains a good feel for the respective road condition at the manual steering wheel or at the manual steering control.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Servovalve for hydraulic power-assisted steering systems of motor vehicles, in the form of a rotary spool valve comprising:
   a rotary spool,
   a control bush, which coaxially surrounds the rotary spool and can be rotated against a spring force relative to the rotary spool,
   a sleeve to which the control bush is connected on the same axis, and
   a bearing arranged or configured axially between the control bush and the sleeve, said bearing securing the control bush and the rotary spool at least axially relative to one another.

2. Servovalve according to claim 1, wherein the control bush is torsionally connected by a form-fit coupling to a shaft part, which is secured axially by contact between one of its end faces and an end face of the rotary spool facing towards it and by an axial stop on the form-fit coupling.

3. Servovalve according to claim 2, wherein the shaft part has external axial splines which run out at the rotary spool end of the shaft part to form a stop, which interacts with corresponding internal splines of the control bush or sleeve.

4. Servovalve according to claim 1,
   wherein a first axial extension is arranged eccentrically to the axis of the rotary spool valve at one end face of the sleeve,
   wherein an end surface, which faces towards the one end face, has a further extension of the same type as the first extension and has the same radial distance from the axis of the rotary spool valve as the first extension, is arranged at an axial distance from the free end of this extension on a part which is torsionally connected to the rotary spool,
   wherein the total axial length of the extensions is shorter than the axial distance between the end face of the sleeve and the end surface of the part which is torsionally connected to the rotary spool, and
   wherein a C-spring, which surrounds a section of the rotary spool, or a section of a shaft part axially extending from the rotary spool, is arranged between said end face of the sleeve and said end surface of the part torsionally connected to the rotary spool,
   the C-spring having free ends which are clamped against the extensions and try to force the latter into a mutually aligned position.

5. Servovalve according to claim 4, wherein the C-spring is preloaded and remains clamped even when the extensions are mutually aligned with one another.

6. Servovalve according to claim 1, wherein the bearing secures the control bush and the rotary spool axially and radially relative to one another.

7. Servovalve according to claim 2, wherein a first axial extension is arranged eccentrically to the axis of the rotary spool valve at one end face of the sleeve,
   wherein an end surface, which faces towards the one end face, has a further extension of the same type as the first extension and has the same radial distance from the axis of the rotary spool valve as the first extension, is arranged at an axial distance from the free end of this extension on a part which is torsionally connected to the rotary spool,
   wherein the total axial length of the extensions is shorter than the axial distance between the end face of the sleeve and the end surface of the part which is torsionally connected to the rotary spool, and
   wherein a C-spring, which surrounds a section of the rotary spool, or a section of a shaft part axially extending from the rotary spool, is arranged between said end face of the sleeve and said end surface of the part torsionally connected to the rotary spool,
   the C-spring having free ends which are clamped against the extensions and try to force the latter into a mutually aligned position.

8. Servovlve according to claim 7, wherein the bearing secures the control bush and the rotary spool axially and radially relative to one another.

9. Servovalve according the claim 7, wherein the C-spring is preloaded and remains clamped even when the extensions are mutually aligned with one another.

10. Servovlve according to claim 9, wherein the bearing secures the control bush and the rotary spool axially and radially relative to one another.

11. Servovlve according to claim 2, wherein the bearing secures the control bush and the rotary spool axially and radially relative to one another.

12. Servovalve according to claim 3, wherein a first axial extension is arranged eccentrically to the axis of the rotary spool valve at one end face of the sleeve,
   wherein an end surface, which faces towards the one end face, has a further extension of the same type as the first extension and has the same radial distance from the axis of the rotary spool valve as the first extension, is arranged at an axial distance from the free end of this extension on a part which is torsionally connected to the rotary spool,
   wherein the total axial length of the extensions is shorter than the axial distance between the end face of the sleeve and the end surface of the part which is torsionally connected to the rotary spool, and
   wherein a C-spring, which surrounds a section of the rotary spool, or a section of a shaft part axially extending from the rotary spool, is arranged between said end face of the sleeve and said end surface of the part torsionally connected to the rotary spool,
   the C-spring having free ends which are clamped against the extensions and try to force the latter into a mutually aligned position.

13. Servovalve according the claim 12, characterized in that the C-spring is preloaded and remains clamped even when the extensions are mutually aligned with one another.

14. Servovlve according to claim 13, wherein the bearing secures the control bush and the rotary spool axially and radially relative to one another.

15. Servovlve according to claim 12, wherein the bearing secures the control bush and the rotary spool axially and radially relative to one another.

16. Servovlve according to claim 3, wherein the bearing secures the control bush and the rotary spool axially and radially relative to one another.

17. Servovlve according to claim 5, wherein the bearing secures the control bush and the rotary spool axially and radially relative to one another.

* * * * *